Jan. 22, 1929.
R. P. LANSING
1,699,701
VEHICLE SPRING CONTROLLER
Original Filed Dec. 22, 1925
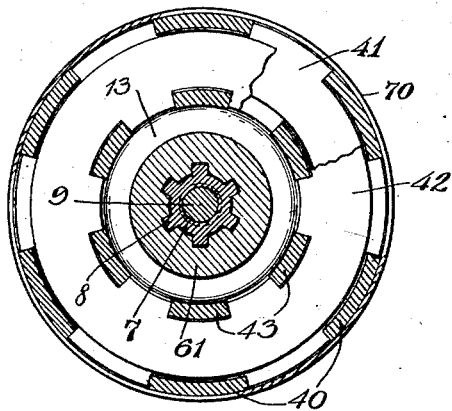
Fig.3.
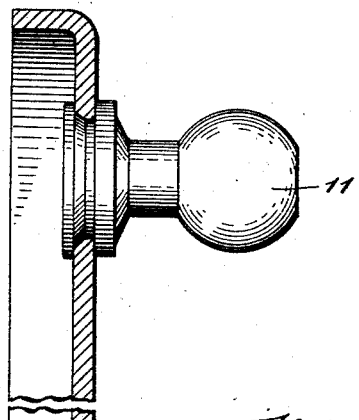
Fig.1.
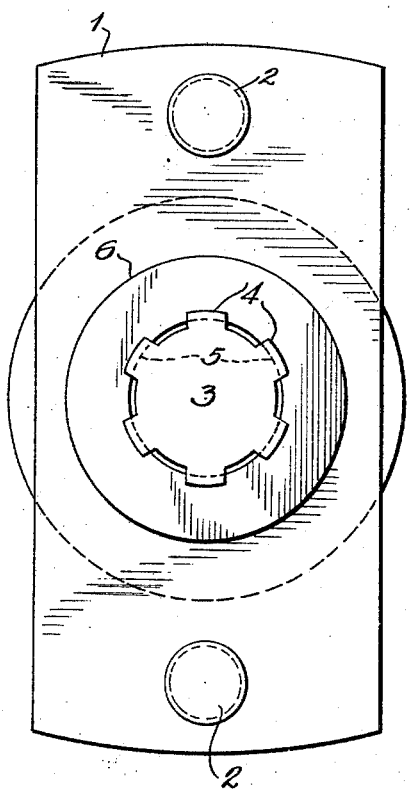
Fig.2.
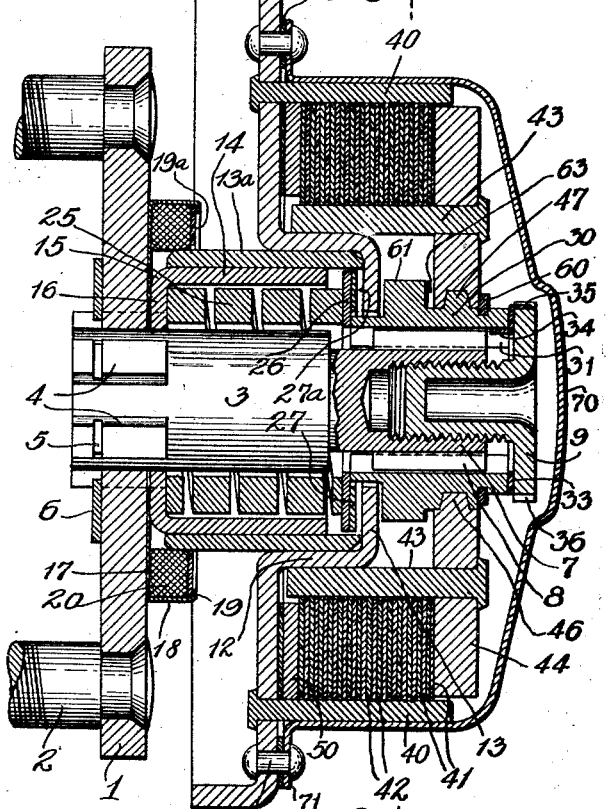
INVENTOR
RAYMOND P. LANSING
BY
ATTORNEY Patented Jan. 22, 1929.

1,699,701

UNITED STATES PATENT OFFICE.

RAYMOND P. LANSING, OF MONTCLAIR, NEW JERSEY.

VEHICLE SPRING CONTROLLER.

Application filed December 22, 1925, Serial No. 77,022. Renewed April 9, 1928.

My invention relates to vehicle spring controllers or "shock absorbers" of the friction type.

The general object is to provide a compact and durable structure of such design that it may be produced at moderate cost, which has an ample total friction surface to produce the desired effects with reasonable spring pressure, and which has certain operative features and advantages sufficiently pointed out in the detail description.

A more particularly object is to provide such a structure in which splines or similar formations are not used in the active operation of the device although they may be employed as irrevoluble or adjustable connections which are practically stationary or inoperative when once adjusted and while the appliance is in service. This is accomplished in the present physical embodiment of the invention by arranging a principal part of the structure, including the arm or lever and the friction plates, for axial movement, while a co-operating member, hereafter referred to as an actuator, is fixed against axial or other movement in the operation of the appliance, although it is axially movable for adjustment purposes.

The characteristics and advantages of the invention are further sufficiently explained in connection with the following detail description of the accompanying drawing, which shows one representative embodiment of the invention. After considering this example, skilled persons will understand that many variations may be made, and I contemplate the employment of any structures that are properly within the scope of the appended claims.

Fig. 1 is a horizontal section (with reference to the usual location in a vehicle) of mechanism embodying the invention in one form.

Fig. 2 is an elevation looking toward the inner face of the base plate.

Fig. 3 is a section at 3—3, Fig. 1.

A base plate 1 is arranged for connection to a vehicle part, for example, to the vertical web of a side frame member by stud bolts 2 or otherwise. A spindle 3 is arranged or secured at the center of the base plate. The spindle may have splines 4 fitting channels in the base plate to prevent rotation. These splines are annularly slotted as at 5, and a dished washer 6 is applied and pressed flat, so that it engages in the slots 5 and prevents outward displacement of the spindle. The outward portion 7 of the spindle is of reduced diameter and is provided with external splines 8. This portion is also bored and threaded to receive an adjustable abutment screw 9.

A lever or arm 10 which may conveniently be of pressed sheet metal is provided near its outward end with a ball 11 or other suitable fitting for link connection to a vehicle member to such an axle or an axle fitting. The hub portion of the lever surrounding the spindle is pressed to form an outwardly projecting cylindrical wall 12 terminating in a centrally apertured web or flange 13. A cylindrical sleeve 13$^a$ is secured within the chamber provided by wall 12 with a press fit. The sleeve 13$^a$ has a bearing fit on the cylindrical wall 14 of a cup 15 whose bottom 16 is located close to the outer face of the base plate. A washer cup or holder 17 of thin sheet metal is placed between the bottom of the cut member 15 and base plate, and this washer holder has a cylindrical outer wall 18 with an inwardly bent lip 19 to engage a thin washer 19$^a$ and enclose and retain a sealing washer 20 of compressible material, such as felt, which resiliently engages the lower periphery of sleeve 13 and forms a seal against escape of lubricant and ingress of dirt and moisture.

The cup member 15 in addition to providing a bearing for sleeve 13$^a$ and the arm, encloses a pressure spring 25, the inward end of which rests on the cup bottom 16. A washer 26 is placed against the outward end of the spring, and another washer 27 with a larger inner diameter is placed against washer 26. The arm flange 13 rests on washer 27 and acts through that washer and washer 26 to compress the spring in certain cases, as explained in the operative description.

A screw member 30 conveniently identified in some cases as an actuator, has internal splines 31 fitting the spindle splines 8. The inward end of the actuator rests on an inner part of washer 26. The outward end of the actuator engages the flanged head of adjustment screw 9 with an interposed lock washer 33 which has a member 34 engaging between the actuator splines and a bendable member 35 engaging in one of the peripheral notches 36 of the screw head to secure the screw in adjusted position. The screw is turned in sufficiently to press the actuator inward and initially compress spring 25 to the desired extent.

The hub portion of lever 10 has a spaced series of pins 40 engaging notches in the peripheries of a set of friction discs 41 which may be identified as rotary discs, since they always move along with the arm. Interleaved with these discs are other discs 42 which are at times relatively stationary. Discs 42 have inner notches engaging a spaced series of pins 43 secured in a pressure plate 44 which has internal multiple screw threads 46 engaging external screw threads 47 on the actuator. These threads usually have a fairly steep pitch, although the pitch angle may be varied within substantial limits. A washer 50 of substantial thickness may be interposed between the arm hub portion and the inward one of the friction discs, to space said disc away from the inner end of the pins 43.

Outward rotary and axial movement of the pressure plate 44 are limited by a stop ring 60 sprung into an annular recess in the actuator and an actuator flange 61, the total motion being indicated in Fig. 1 by the clearance at 63. This clearance may be varied to regulate the range of movement of the pressure plate. Another, or additional clearance may be provided intermediate flange 13 and the outer end of spring 25, to provide for a free arc or "period" of movement, as further explained below. Such a clearance is indicated at 27$^a$, between flange 13 and washer 27.

All of the outer portion of the mechanism, including the friction discs, actuator, pressure plate, etc., are enclosed and protected by a cover 70 of pressed sheet metal having a flange 71 secured to the arm by screws or rivets 72, with an interposed gasket 73 to insure a tight seal. The housing serves to retain a suitable lubricant which in addition to its lubricating effect serves to cushion relatively movable parts and substantially or entirely eliminate noticeable noise or rattle.

While certain splined connections are used, for example, the splines 8 and 31 locking the actuator against rotary movement, these are provided only as a convenient means to permit axial adjustment of the actuator to control the initial spring pressure, and to prevent its rotation upon the spindle. When once adjusted, the actuator has no movement, being always held by the spring pressure acting through washer 26, against the screw flange 9, and no difficulties are therefore experienced, such as might be caused, for example, by wear, producing irregularities or shoulders in engaging spline surfaces which have relative sliding movement.

The appliance may be arranged to oppose the greatest frictional resistance either to vehicle spring compression or recoil. It is usually considered advisable to apply the greatest resistance to recoil and therefore in the following operative explanation it will be understood that the appliance is so arranged. When the screw threads 46 and 47 have a right hand lead, counter-clockwise movement of arm 10, as viewed in Fig. 2, or from the left in Fig. 1, corresponds to the vehicle spring recoil which the axle moves away from the vehicle frame or body.

When the vehicle wheel strikes a road surface irregularity which causes a vehicle spring compression, arm 10 moves counter-clockwise. Bearing sleeve 13$^a$ turns along with the arm on the surface of the cylindrical cup wall 14. The drag of the friction discs causes the pressure plate 44 to move along with the arm a short distance, during which it is backed off by the action of the screw threads, the outward movement being limited by stop ring 60, as shown in Fig. 1. There is therefore no active pressure on the discs and arm movement in the stated direction is practically free. When the vehicle spring recoils, arm 10 moves clockwise and the drag of the friction discs causes pressure plate 44 to rotate with the arm and discs without resistance to the recoil movement through a small arc which is the free range or "period" above referred to, until the clearance at 27$^a$ is taken up. Resistance is then afforded by the screw threads to further rotation of the pressure plate, and this produces sufficient friction pressure between the discs and upon the pressure plate to cause it to move definitely along with the arm and discs. As it rotates in this part of the arc of travel, the screw thread reaction causes the pressure plate, discs and arm to move axially inward as they rotate, the flange 44 turning on washer 27 and 26 as thrust bearing members, and at the same time the entire rotary structure is moved inward, causing spring 25 to be additionally compressed by force transmitted through flange 44 on the washers, upon the outer end of the spring. There is no frictional resistance during this movement, except the slight or negligible friction of the thrust bearing surfaces, but resistance to arm movement and the vehicle spring recoil is afforded by the effort required to additionally compress spring 25. This range of movement may be identified as the spring compressing or wind-up range or "period." This range or arc of arm movement is terminated when the inner face of the pressure plate strikes actuator flange 61, whereupon the plate is locked against the further rotation and inward movement. If the vehicle spring recoil is extensive, the arm continues to move and frictional resistance under full spring pressure is afforded by slippage of all the friction discs, and this resistance continues to the end of the recoil movement after being built up practically immediately at the end of the wind-up period.

In the next vehicle spring compression movement the counterclockwise movement of arm 10 causes the pressure plate to quickly back off on the actuator screw thread, this action being facilitated by the spring pressure and the lead of the threads, with accompanying outward movement of the arm, discs and pressure plate, until the spring again seats against the inward end of the actuator, and the clearances at 63 and 27ª are restored, as shown in Fig. 1. All spring pressure is then relieved and the plates are freed of friction pressure, as previously described, in connection with a vehicle spring compression movement.

When the arm movement is slight, as in running over comparatively smooth roads, the range of movement of the pressure plate may be substantially within that provided by the clearance 27ª, this range being the free period above mentioned, in which vehicle spring movement is not affected; or if this range is exceeded, the resistance to vehicle spring recoil will be within the wind-up range above referred to, where the resistance is caused only by work required to compress spring 25 and is therefore substantially less than that provided by frictional slippage of the discs under full spring pressure, when the recoil is of greater range, as above described.

The total axial movement of arm 10 and associated parts, is only a small fraction of an inch and is easily accommodated by the flexible or articulated linkage employed to connect the arm or its fitting 11 with the vehicle axle.

I claim:

1. Mechanism of the class described, comprising a base, a relatively rotary structure including an arm and friction means, a yieldable pressure member, a normally stationary actuator, means for adjusting the actuator to place the yieldable pressure member under stress, and means cooperating with the actuator and rotary structure to produce frictional resistance to rotation in one direction and relax the frictional resistance in the other direction.

2. Mechanism of the class described, comprising a base, a relatively rotary structure including an arm and friction means, a yieldable pressure member, a normally stationary actuator, means for adjusting the actuator to stress the yieldable pressure member, and means co-operating with the actuator and rotary structure to additionally stress the yieldable pressure member in one direction of rotation of said structure.

3. Mechanism of the class described, comprising a base, a yieldable pressure member, a normally stationary actuator secured against rotation and arranged for adjustment axially in relation to the base and co-operating with the yieldable pressure member, a relatively revoluble structure comprising an arm and friction means, and a member co-operating with the actuator to produce frictional resistance in one direction of rotation and relieve the frictional resistance in the other direction of rotation.

4. Mechanism of the class described, comprising a base, a spring, a normally stationary actuator secured against rotation and arranged for adjustment axially in relation to the base and co-operating with the spring and normally stressing the spring, a relatively revoluble structure comprising an arm and friction means, and means co-operating with the actuator to additionally stress the spring and thereafter produce frictional resistance in one direction of rotation, and to relieve the frictional resistance in the other direction of rotation.

5. Mechanism of the class described, comprising a base, a relatively rotary structure including an arm and friction means, a yieldable pressure member, a normally stationary actuator, and a relatively revoluble and axially movable structure including an arm, friction means and a member co-operating with the actuator to move the rotary structure axially when it revolves in one direction and additionally tension the yieldable pressure member and to thereafter produce frictional resistance to such rotation, and also acting in the other direction of rotation to substantially relieve the frictional resistance.

6. Mechanism of the class described, comprising a base, a relatively rotary structure including an arm and friction means, a yieldable pressure member, a normally stationary actuator, and a relatively revoluble and axially movable structure including an arm, friction means and a member cooperating with the actuator to move the rotary structure axially when it revolves in one direction and additionally tension the yieldable pressure member and to thereafter produce frictional resistance to such rotation, and also acting in the other direction of rotation to restore the yieldable pressure member to normal tension and substantially relieve the friction means from resistance-producing pressure.

7. Mechanism of the class described, comprising a base, a spring, a normally stationary actuator secured against rotation and arranged for adjustment axially in relation to the base and co-operating with the spring and normally stressing the spring, and a relatively revoluble and axially movable structure including an arm, friction means and a member co-operating with the actuator to move the rotary structure axially when it revolves in one direction and additionally stress the spring and to thereafter produce frictional resistance to such rotation, and also acting in the other direction of rotation to substantially relieve the frictional resistance.

8. Mechanism of the class described, comprising a base, a spring, a normally stationary actuator secured against rotation and arranged for adjustment axially in relation to the base and co-operating with the spring and normally stressing the spring, and a relatively revoluble and axially movable structure including an arm, friction means and a member co-operating with the actuator to move the rotary structure axially when it revolves in one direction and additionally stress the spring and to thereafter produce frictional resistance to such rotation, and also acting in the other direction of rotation to restore the spring to normal stress and substantially relieve the friction means from resistance-producing pressure.

9. Mechanism of the class described, comprising a base, a spindle secured thereon, a spring located about the spindle, an actuator having splined connection with the spindle, means for adjusting the actuator axially to place the spring under controllable initial tension, the actuator being axially immovable in normal operation whereby wear of the spline surfaces is avoided, and a structure arranged for rotation about the spindle and for axial movement and including a lever arm, friction members, and a pressure plate co-operating with the actuator to produce axial movement of said structure and additional compression of the spring in one direction of rotation, and to relieve the structure of spring pressure in the other direction of rotation.

10. Mechanism of the class described, comprising a base, a spindle secured thereon, a spring located about the spindle, an actuator having splined connection with the spindle, means for adjusting the actuator axially to place the spring under controllable initial tension, the actuator being axially immovable in normal operation whereby wear of the spline surfaces is avoided, and a structure arranged for rotation about the spindle and for axial movement and including a lever arm, means by which said arm co-operates substantially-directly with the spring, friction members, and a pressure plate co-operating with the actuator to produce axial movement of said structure and additional compression of the spring, with subsequent frictional-slippage, in one direction of rotation, and to substantially relieve the structure of spring pressure in the other direction of rotation.

11. Mechanism of the class described, comprising a base, a spindle secured thereon, a spring located about the spindle, an actuator having splined connection with the spindle, means for adjusting the actuator axially to place the spring under controllable initial tension, the actuator being axially immovable in normal operation whereby wear of the spline surfaces is avoided, and a structure arranged for rotation about the spindle and for axial movement and including a lever arm, friction members, and a pressure plate, the actuator and pressure plate having co-operating means to limit rotation of the latter in one direction and produce frictional resistance by slippage of the friction means under spring pressure during continuation of rotation of said structure in the stated direction.

12. Mechanism of the class described, comprising a base, a spindle secured thereon, a spring located about the spindle, an actuator having splined connection with the spindle, means for adjusting the actuator axially to place the spring under controllable initial tension, the actuator being axially immovable in normal operation whereby wear of the spline surfaces is avoided, and a structure arranged for rotation about the spindle and for axial movement and including a lever arm, means by which said arm co-operates substantially-directly with the spring, friction members, and a pressure plate, the actuator and pressure plate having co-operating means acting in one rotative direction to cause additional spring compression and to then limit rotation of the pressure plate and produce frictional resistance by slippage of the friction means under spring pressure.

13. Mechanism of the class described, comprising a base, a spindle secured thereon, a spring cup about the spindle, a spring thereon, an arm mounted for rotation and axial movement about the spring cup, the arm having means for engaging and additionally comprising the spring, an actuator having splined connection with the spindle, means for adjusting the actuator axially to initially compress the spring, a pressure plate having screw co-operation with the actuator, and friction discs connected in alternate relation to the arm and pressure plate.

14. Mechanism of the class described, comprising a base, a spindle secured thereon, a spring cup about the spindle, a spring thereon, an arm mounted for rotation and axial movement about the spring cup, the arm having means for engaging and additionally compressing the spring, an actuator having splined connection with the spindle, means for adjusting the actuator axially to initially compress the spring, a pressure plate having screw co-operation with the actuator, friction discs connected in alternate relation to the arm and pressure plate, and means acting between the actuator and pressure plate to limit movement of the latter in one direction.

15. Mechanism of the class described, comprising a base, a spindle secured thereon, a spring cup about the spindle, a spring thereon, an arm mounted for rotation and axial movement about the spring cup, the arm having means for engaging and additionally compressing the spring, an actuator having splined connection with the spindle, means for adjusting the actuator axially to initially compress the spring, a pressure plate having screw co-operation with the actuator, friction discs connected in alternate relation to the arm and pressure plate, and a sealing washer effective between the base and the relatively movable arm.

16. Mechanism of the class described, comprising a base, a spindle secured thereon, a spring cup about the spindle, a spring thereon, an arm mounted for rotation and axial movement about the spring cup, the arm having means for engaging and additionally compressing the spring, an actuator having splined connection with the spindle, means for adjusting the actuator axially to initially compress the spring, a pressure plate having screw co-operation with the actuator, friction discs connected in alternate relation to the arm and pressure plate, and a housing enclosing outward portions of the mechanism including the actuator, friction discs and pressure plate.

Signed at Hoboken, in the county of Hudson and State of New Jersey, this seventh day of December, A. D. 1925.

RAYMOND P. LANSING.